(12) United States Patent
Tompkin et al.

(10) Patent No.: US 6,906,861 B2
(45) Date of Patent: Jun. 14, 2005

(54) LIGHT-DIFFRACTING BINARY GRATING STRUCTURE

(75) Inventors: Wayne Robert Tompkin, Baden (CH); René Staub, Cham (CH); Andreas Schilling, Zug (CH)

(73) Assignee: OVD Kinegram AG, Zug (CH)

( * ) Notice: Subject to any disclaimer, the term of this patent is extended or adjusted under 35 U.S.C. 154(b) by 0 days.

(21) Appl. No.: 10/415,640

(22) PCT Filed: Nov. 2, 2001

(86) PCT No.: PCT/EP01/12679
§ 371 (c)(1),
(2), (4) Date: Aug. 25, 2003

(87) PCT Pub. No.: WO02/37145
PCT Pub. Date: May 10, 2002

(65) Prior Publication Data
US 2004/0021945 A1 Feb. 5, 2004

(30) Foreign Application Priority Data
Nov. 3, 2000 (DE) .......................... 100 54 503

(51) Int. Cl.⁷ ............................................... G02B 5/18
(52) U.S. Cl. ...................... 359/567; 359/572; 359/575; 428/916
(58) Field of Search .......................... 359/2, 566, 567, 359/569, 572, 575; 283/85, 86; 428/915, 916

(56) References Cited

U.S. PATENT DOCUMENTS

| | | | |
|---|---|---|---|
| 4,304,809 A | * | 12/1981 | Moraw et al. ............ 428/195.1 |
| 4,400,057 A | * | 8/1983 | Moraw et al. ............... 359/575 |
| 4,832,445 A | | 5/1989 | Haines et al. |
| 5,101,184 A | * | 3/1992 | Antes ........................ 235/454 |
| 5,113,286 A | | 5/1992 | Morrison |
| 5,574,597 A | | 11/1996 | Kataoka |
| 5,729,365 A | * | 3/1998 | Sweatt ........................ 359/2 |
| 5,784,200 A | * | 7/1998 | Modegi ..................... 359/567 |
| 5,825,547 A | | 10/1998 | Lee |
| 6,005,691 A | * | 12/1999 | Grot et al. ..................... 359/2 |
| 6,057,082 A | | 5/2000 | Korth |

FOREIGN PATENT DOCUMENTS

| | | | | |
|---|---|---|---|---|
| DE | 3117092 A1 | 11/1982 | | |
| DE | 4016362 A1 | 11/1991 | | |
| EP | 0328086 A2 | 8/1989 | | |
| EP | 0660139 A1 | 6/1995 | | |
| EP | 0712012 A1 | 5/1996 | | |
| GB | 2220386 A | * | 1/1990 | ........... B42D/15/02 |
| WO | WO 98/10324 | 3/1998 | | |

* cited by examiner

Primary Examiner—John Juba, Jr.
(74) Attorney, Agent, or Firm—Hoffman & Baron, LLP

(57) ABSTRACT

A light-diffractive binary grating structure has a microscopic mesa structure (2) whose plateaux (5) are separated by valleys (4) of substantially rectangular cross-section, wherein the arrangement of the valleys (4) is periodically repeated. Within a period (T) of the mesa structure (2) at least N valleys (4) separate the plateaux (5), N being an integer and greater than 2. The mesa structure (2) is an additive superimposition of N phase-shifted rectangular structures which have the same period (T) of the mesa structure (2). Each of the rectangular structures has a phase shift such that the plateaux (5) of the one rectangular structure fall into the valleys (4) of the N−1 other rectangular structures. In addition the resulting mesa structure (2) has only a single valley between two plateaux (5), which is of a width greater than a seventh of the period (T). The binary grating structures are suitable for use in optically diffractive security elements as the binary grating structures cannot be copied with holographic means.

16 Claims, 4 Drawing Sheets

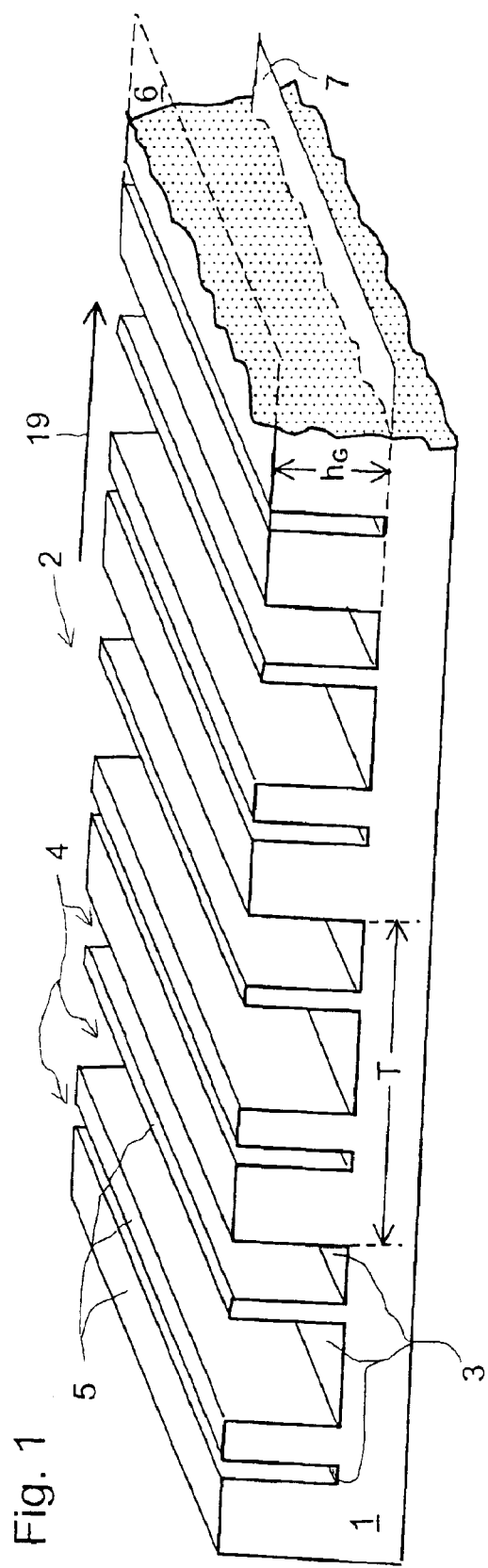
Fig. 1
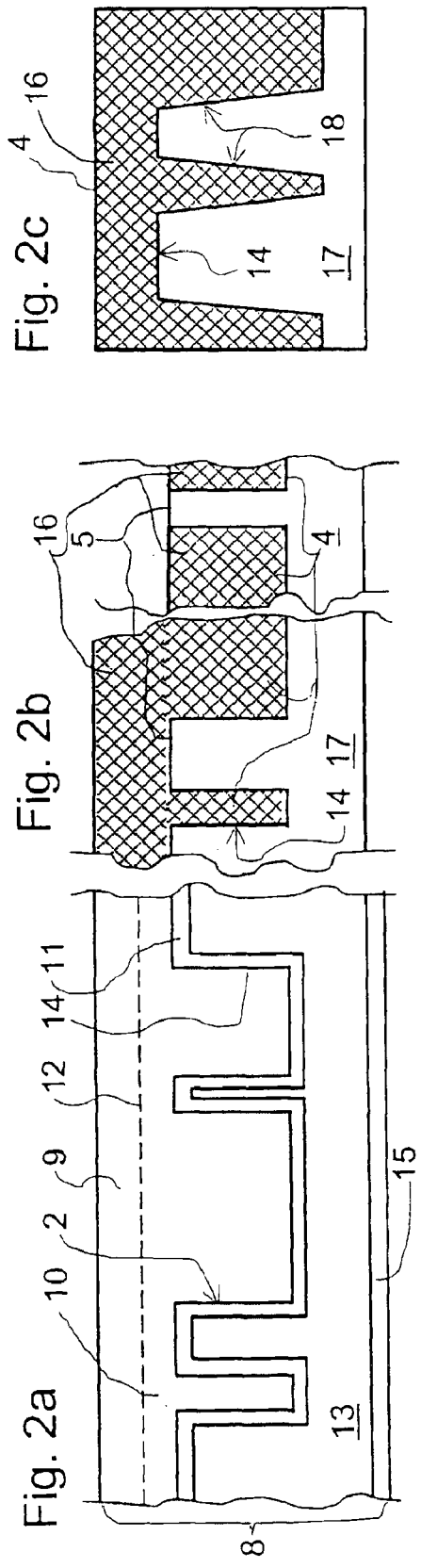
Fig. 2a
Fig. 2b
Fig. 2c

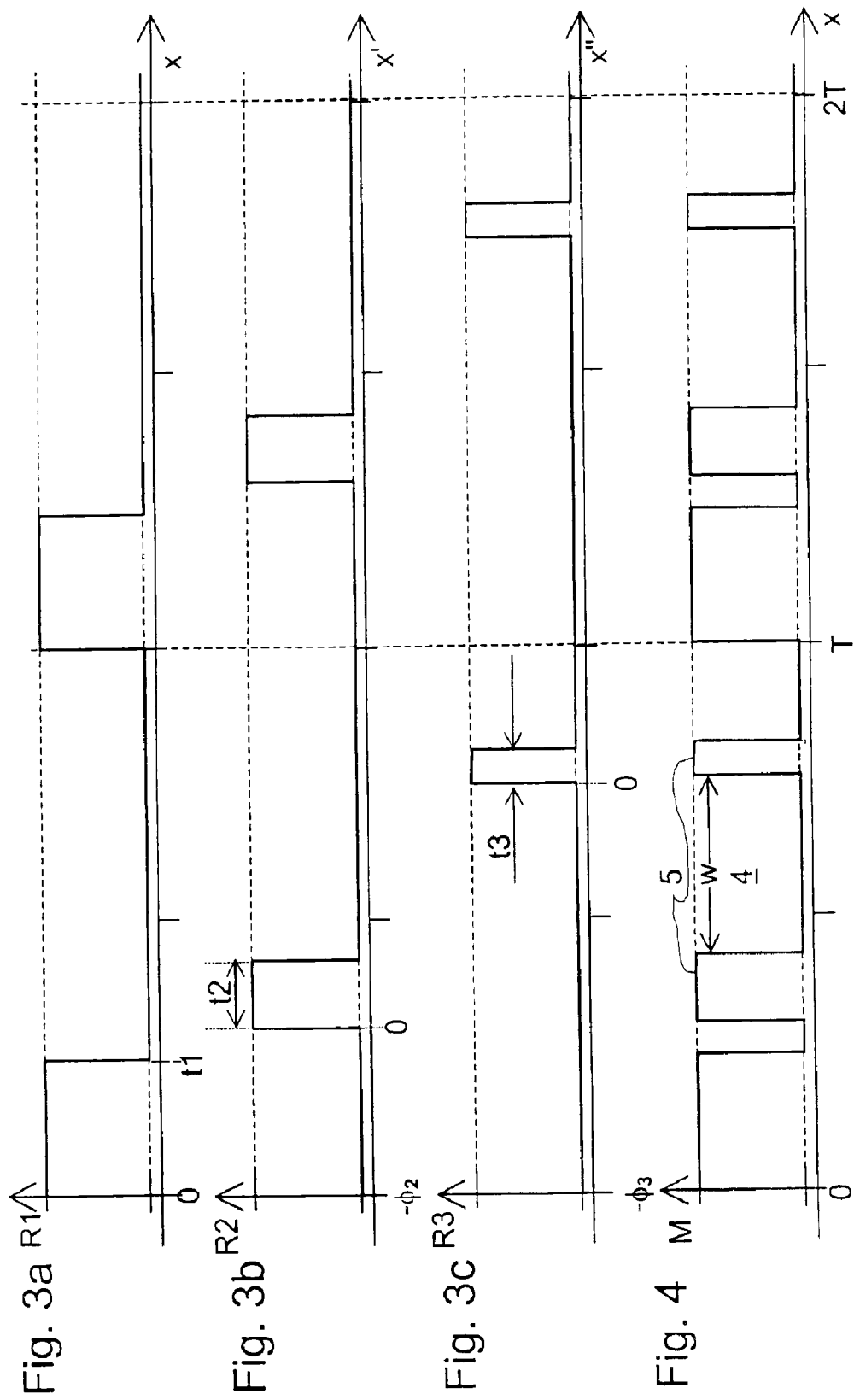

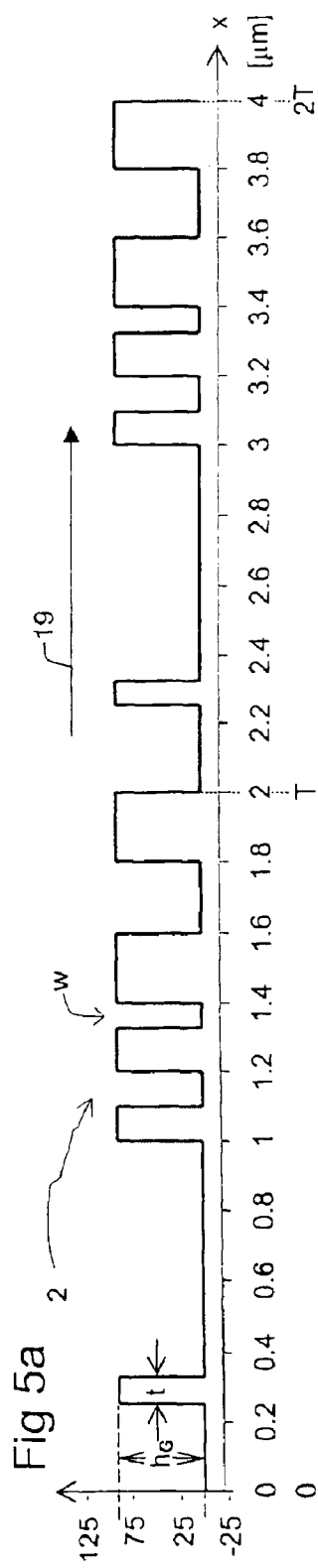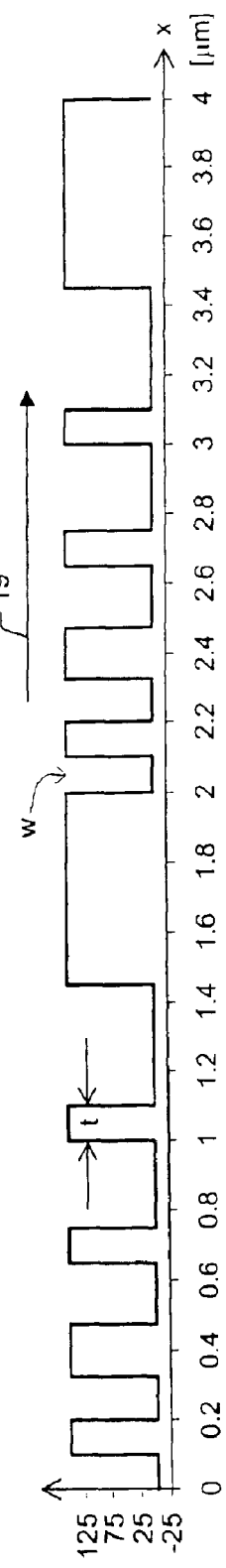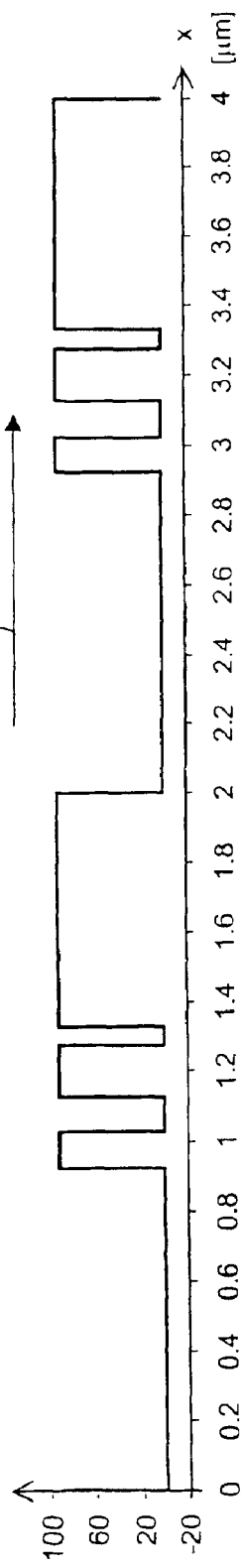

US 6,906,861 B2

LIGHT-DIFFRACTING BINARY GRATING STRUCTURE

This application claims priority based on an International Application filed under the Patent Cooperation Treaty, PCT/EP01/12679, filed on Nov. 2, 2001, and German Patent Application No. 100 54 503.3, filed on Nov. 3, 2000.

BACKGROUND OF THE INVENTION

The invention relates to a light-diffractive binary grating structure and the use thereof in a security element as set forth in the classifying portions of claims 1 and 10.

Such grating structures are distinguished by a high level of diffraction deficiency and pronounced asymmetry and polarisation of the diffracted light and are suitable for the surface patterns which are known as visual security features, comprising a mosaic of surface elements occupied by diffractive structures.

Those security features serve as an authenticity feature which is difficult to forge, for valuable articles, documents, identity cards or passes, bank notes and so forth and are described for example in EP 0 105 099 B1. The surface elements of the security features have periodic diffractive grating structures with predetermined grating parameters such as profile, spatial frequency and azimuthal orientation and so forth, in such a way that the aspect of the illuminated security feature changes in a predetermined fashion in respect of color and pattern, upon being rotated and/or tilted. If oppositely oriented asymmetric grating structures are arranged in adjacent surface elements, as is known for example from EP 0 360 969 A1, the levels of intensity of the surface elements, such levels being perceived by a viewer, are interchanged when the substrate is turned through 180°.

DE 32 06 062 A1 shows a simple binary grating structure and the use thereof for a security feature. The binary grating structure has as its profile a structure which follows a simple periodic rectangular function. The pulse duty cycle of the rectangular function, that is to say the ratio of the width of the valley or trough to the length of the period of the rectangular structure, is constant and is of a value of 50% so that the diffracted light has the greatest degree of color saturation.

A development of the security feature with binary grating structures is described in EP 0 712 012 A1. A surface element of the security feature is occupied by a periodic rectangular structure. The pulse duty cycle of the rectangular function continuously changes over the surface element from a maximum value to a minimum value so that, when the surface element is illuminated, the degree of color saturation reaches a maximum in a region within the surface element. Also shown are non-periodic rectangular structures which are arranged with randomly selected dimensions in respect of depth and width to form a diffraction structure in order to enhance the anti-forgery aspect of the security elements. It will be noted however that the resulting pattern is highly complex and is difficult for an observer to identify as the genuine security feature.

U.S. Pat. No. 4,846,552 discloses an electron beam lithography process for producing binary grating structures for focusing optical elements. Even with the simple rectangular structures with a pulse duty cycle of 50%, it is possible to achieve high levels of diffraction efficiency for linearly polarised light by a clever choice of the depth of the structure, for example 25% of the period length of the rectangular structure. The importance of the binary grating structures is based on the fact that they can be produced with a high degree of accuracy and replicated by molding.

The above-mentioned simple rectangular structures can be copied using holographic means, in which respect, in the case of a copy of the symmetrical rectangular structure with a pulse duty cycle of about 50%, there is only a slight drop in the level of diffraction efficiency. The level of diffraction efficiency of the copy worsens, the more asymmetrical that the rectangular structure is. A surface element with the rectangular structure whose pulse duty cycle continuously changes along a predetermined direction in accordance with EP 0 712 012 A1 has in the copy, instead of the changing color saturation, a variation in the intensity of the diffracted color. As changing color saturation is visually difficult to distinguish from changing color intensity without reference to a genuine security element, an unauthorised copy of the security element cannot be immediately recognised.

SUMMARY OF THE INVENTION

The object of the present invention is to provide a grating structure which is inexpensive to replicate and which is suitable for use in optically diffractive security elements, which is expensive and complicated to produce and difficult to copy.

In accordance with the invention the specified object is attained by the features recited in the characterising portions of claims 1 and 10. Advantageous configurations of the invention are set forth in the appendant claims.

BRIEF DESCRIPTION OF THE DRAWINGS

Embodiments of the invention are described in greater detail hereinafter and illustrated in the drawing in which:

FIG. 1 is a view of a binary grating structure,

FIGS. 2a–2c are views in cross-section through a laminate with the grating structure, FIGS. 3a–c show rectangular structures, FIG. 4 shows a mesa structure, FIGS. 5a–c show examples of the mesa structures, FIGS. 6a+b show surface patterns with the mesa structure shown in FIG. 5a, FIGS. 7a–c show the surface patterns with the mesa structure shown in FIG. 5b, FIGS. 8a–c show the surface patterns of FIGS. 7a–c turned through 180°.

DESCRIPTION OF THE PREFERRED EMBODIMENTS

Figure 6A:
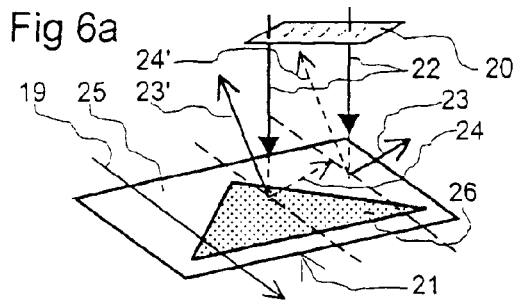

A portion shown in FIG. 1 of a periodic binary grating structure has a microscopically fine profile form of a mesa structure 2, which is molded into a flat substrate 1. Valley bottoms 3 of valleys 4 are set downwardly from the top side of the substrate 1. They subdivide the surface into plateaux 5 of the mesa structure 2, the valleys 4 being of a substantially rectangular cross-section. At least three valleys 4 and three plateaux 5 form a period T of the mesa structure 2. The plateaux 5 are disposed in the plane 6 of the surface of the substrate 1. The valley bottoms 3 define a second plane 7 which is parallel to the first plane 6 and which is set downwardly from the surface of the substrate 1 by a profile height $h_G$. Such grating structures with only two planes 6, 7 are also referred to as binary grating structures. The valleys 6 separate the plateaux 5 in such a way that no further periodicity occurs within the period T.

The periodic binary grating structure diffracts electromagnetic radiation. For security features which are to be adjudged visually the length of the period T and the profile height h of the grating structure is to be adapted to the wavelength λ of the visible light whose spectrum of the wavelengths λ extends in the range 380 nm<λ<780 nm. The period T is for example of a value from the range for T of 250 nm to 5000 nm. For 'zero order' microstructures the condition λ/T≧1 applies. With the 'zero order' microstructures all diffraction orders apart from the zero order are suppressed. Under the condition λ/T<1 in contrast the light incident on the binary grating structure is also diffracted into higher diffraction orders. Those microstructures are not to be copied with conventional holographic methods if the period T≦2 μm.

The profile height h of the valleys 4 is constant. The microscopic mesa structure 2 is optically effective and has valleys 4 and plateaux 5 which are parallel, straight, of a meander shape or curved. The mesa structure 2, as a periodic grating structure, is described by its parameters, an azimuth angle ψ relative to a significant direction, the period T or spatial frequency f=1/T, a profile shape of the mesa structure 2 and a profile height h. The geometrical profile height $h_G$ within the mesa structure 2 is not to be confused with the optically effective profile height h. If a transparent material with a refractive index n>1 fills up the valleys 4, then the geometrical profile height $h_G$ multiplied by the refractive index n becomes optically effective as the profile height h. The optically effective profile height h is selected from the range of 25 nm to 5000 nm, in which respect preferred values of the profile height are for example in the lower range up to a quarter of the wavelength, λ/4. If the substrate 1 illustrated here has the negative profile shape of the mesa structure 2, the substrate 1 is suitable for molding of the mesa structure 2 in plastic material or for stamping or embossing very soft metal (Ag, Al, Au, Cu and so forth). That permits inexpensive replication of the mesa structure 2. Harder metals such as steel, copper-nickel alloy for coins and so forth are to be structured by a per se known, metal-removing method.

FIGS. 2a to 2c show cross-sections through various laminates 8 of a security element with the mesa structure 2. In FIG. 2a the mesa structure 2 is molded into a base foil or film 9 of plastic material which is as clear as glass or transparent. In one processing method, the rough base film 9, prior to molding of the mesa structure 2, is coated on one side with an at least transparent thermoplastic lacquer layer 10. The mesa structure 2 is molded into the lacquer layer 10. In an inexpensive construction, the lacquer layer 10 is already covered prior to the molding operation with a metallic or dielectric reflection layer 11. In another molding method, the base layer 9 is covered with the transparent lacquer layer 10 which can be hardened by means of ultraviolet light. The female molding configuration of the mesa structure 2 is molded during the hardening operation into the lacquer layer 10 while it is still soft and while it is still easily deformable. With both methods, the thickness of the lacquer layer 10 is greater than the profile height $h_G$ (FIG. 1). If the base layer 9 only serves as a carrier for the lacquer layer 10 in order to produce a very thin laminate 8, a separating layer indicated by the broken line 12 in the view of FIG. 2a is provided between the base film 9 and the lacquer layer 10. The separating layer permits removal of the base film 9 after the security element has been applied to a support for same. After the hardening operation the metallic or dielectric reflection layer 11 is applied. The jump in refractive index n, which is produced by the reflection layer 11, makes an interface 14 with the mesa structure 2 optically effective. Then, a protective layer 13 which fills the valleys is applied to the molding side. The free surface of the protective layer 13 is then provided with an adhesive layer 15 or the material of the protective layer 13 is itself an adhesive. The security element is visible through the layers 9, 10 arranged over the mesa structure 2. If both the reflection layer 11, the protective layer 13 and the adhesive layer 15 if provided are transparent, the security element is transparent and is suitable for protecting individual indicia on a document. The indicia remain visible through the security element which is stuck on to the document.

The transparent material is optically clear and transmits the entire spectrum of visible light (=material which is as clear as glass) or only certain spectral ranges thereof (=colored material).

The laminate 8 in FIG. 2b shows a further arrangement of the cover layer 16 and a base layer 17, the common interface 14 of which defines the mesa structure 2 (FIG. 1). The materials of the two layers 16, 17 differ in respect of their refractive indices $n_1$, $n_2$ and also cause a jump Δn in the refractive index, which jump defines the mesa structure 2. So that the mesa structure 2 is optically effective and diffracted light is visually recognisable, the jump must be $\Delta n=|n_1-n_2|>0.1$ at the common interface 14. In an embodiment the two layers 16, 17 are two transparent plastic materials. In another embodiment the base layer 17 is the metal substrate 1 (FIG. 1) which is provided with the transparent cover layer 16 of plastic material, which fills the valleys 4.

In the embodiment at the left in FIG. 2b the plastic layer 16 also covers the plateaux 5 while in the embodiment at the right the plastic layer 16 only just fills the valleys 4. The common interface 14, defining the mesa structure 2 (FIG. 1), between the metal surface of the substrate 1 and the plastic layer has a high level of diffraction efficiency E. In a use of the embodiment of the laminate 8 as shown at the right the layer 17 is a copper-nickel alloy as are used for example for coins, with the mesa structure 2 being produced in the surface thereof by the removal of material, for example by means of etching or intensive laser light.

Governed by manufacturing considerations the cross-sections of the valleys 4 have slight deviations from the ideal rectangular shape. FIG. 2c shows a portion of the laminate 8 (FIG. 2a). The side walls of the valleys 4, which are defined by the interface 14 between the layers 16, 17, are inclined in a V-shape in such a way that the valleys 4 are of trapezoidal cross-sections. In addition the edges are with a high degree of probability rounded, although this is not shown in FIG. 2c for reasons relating to drawing. In contrast to the view in FIG. 2c, the deviations from the pure rectangular shapes of the mesa structure 2 are so small that the cross-sections are to be considered as being substantially rectangular.

The mesa structure 2 in FIG. 1 is described by a rectangular function M(x) (FIG. 4) along a distance x in the direction of an arrow 19 which is directed parallel to the plane 6 and perpendicularly to the valleys 4.

FIGS. 3a to 3c and 4 show by way of example the periodic rectangular functions R1(x), R2(x'), R3(x") and M(x) which are shown over two successive periods T along the path x, x' or x". The rectangular function M(x) arises out of additive superimposition of at least three phase-shifted rectangular structures R1(x), R2(x'), R3(x") with the period T of the mesa structure 2. The N rectangular structures R1(x), R2(x'), R3(x"), upon summing to give M(x), have a phase shift $\phi_1$, $\phi_2$, $\phi_3$, . . . relative to each other in such a way that the plateaux 5 of the one rectangular structure fall into the valleys 4 of the N−1 other rectangular structures. That condition secures the binary grating structure for the sum function M(x).

In FIG. 4 the periodic rectangular function M(x) is the sum of the N=3 rectangular functions which are shown in FIGS. 3a to 3c. In this example the rectangular function R1 involves a phase shift $\phi_1=0°$, and therefore the sum M(x)= R1(x)+R2(x+$\phi_2$)+R3(x+$\phi_3$).

The ratio of the pulse width t of the rectangular pulses R to the period length T is referred to as the pulse duty cycle t/T. At least one rectangular function R has a pulse duty cycle of at most 6%, for example the rectangular function R3(x") in the view in FIG. 3c. In one embodiment that smallest pulse width t of the mesa structure 2 is at most a fifth of the wavelength X of the incident visible light.

The phase shifts $\phi_1$, $\phi_2$, $\phi_3$, . . . and the pulse widths t1, t2, t3 . . . are such that on the one hand in the resulting rectangular function M(x) of the mesa structure 2 only a single valley 4 between two plateaux 5 is of a greatest width w greater than a seventh of the period T. On the other hand at least one valley 4 measures a smallest width w of at most a fifth of the wavelength $\lambda$. Parameters such as the number N, the period T, the profile height h, the phase shift $\phi$ and the pulse width t determine the mesa structure 2.

Due to manufacturing considerations the structure width of the mesa structure 2 is not to be less than a smallest width. The smallest structure width denotes the smallest of the values of the widths w and pulse widths t arranged in the mesa structure 2. The smallest structure width which can be managed from manufacturing aspects depends on the geometrical profile height $h_G$ as molding of the smallest structure width of more than half the geometrical profile height $h_G$ causes major manufacturing molding difficulties. The smallest structure width which can be attained technically today is about 50 nm with a geometrical profile height $h_G$ of up to 100 nm.

Due to the above-mentioned conditions the number N of the rectangular functions R(x) forming the function M(x) is limited upwardly by the period length T and the smallest structure width to about 10, wherein N is preferably in the range of 3 up to and including 5.

In an embodiment of the mesa structure with the period T on the one hand the sum of the pulse widths t of all plateaux 5 in the one half-period T/2 is greater than the sum of the widths w of all valleys 4 in the same half-period T/2 and on the other hand in the second half-period T/2 the sum of the pulse widths t of all plateaux 5 is smaller than the sum of the widths w of all valleys 4 of the second half-period T/2. Each half-period T/2 includes at least one valley 4 and one plateaux 5. Such a mesa structure 2 has an asymmetrical diffraction behaviour and deflects the incident light asymmetrically into the various diffraction orders. Associated with the asymmetrical mesa structure 2 is a significant direction (grating vector) which is marked by an arrow 19 (FIG. 1) which is in the plane 6 and which is shown perpendicularly to the valleys 4.

The above-described mesa structures 2 have microscopic and sub-microscopic structures, that is to say structure widths smaller than the wavelength $\lambda$ of light. For such structures the scalar theory can no longer qualitatively describe the diffraction behaviour of the sub-microscopic mesa structure 2. Only an application of exact electromagnetic theory and precise calculations as are contained for example in the book 'Electromagnetic Theory of Gratings' by R Petit, Editor, Springer-Verlag, Heidelberg 1980, can with a great deal of computing expenditure describe the diffraction behaviour of the mesa structures 2 with sub-microscopic structures. Scalar theory fails because the behaviour of light is completely different for the TE- and TM-polarised electromagnetic waves upon incidence on the binary grating structure.

In the case of TE-polarisation in which the electrical field is oriented parallel to the valleys 4 of the mesa structure 2, such strong surface currents flow in the reflection layer 11 (FIG. 2a) or in the interface 14 (FIG. 2b) that the mesa structure 2 acts like a mirror. Stated in heuristic terms the field of the TE-polarised waves does not penetrate into the valleys of the mesa structure 2 and therefore does not experience the action of the mesa structure 2. In the case of TM-polarisation in which the electrical field is oriented perpendicularly to the valleys 4, that is to say in the direction of the arrow 19 (FIG. 1) of the mesa structure 2 the surface currents are not so easily produced in the layer 11 or 14 respectively. The electrical field of the TM-waves can therefore penetrate into the depth of the valleys 4 and is influenced by the mesa structure 2 in such a way that the TM-waves are diffracted.

The light-diffractive binary grating structures which as a profile have the asymmetrical mesa structures 2 with the sub-microscopic structure elements exhibit extraordinary diffraction properties upon being illuminated with light which is incident perpendicularly on to the mesa structures 2. The incident light is diffracted primarily into a single diffraction order while the diffracted light in the other diffraction orders involves only low levels of intensity which are scarcely visually perceptible. FIGS. 5a to 5c show as an example the rectangular functions M(x) of three mesa structures 2 with a period of T=2 $\mu$m over two periods T. The distance x is plotted on the abscissa in micrometers in the direction of the arrow 19 while the geometrical profile height $h_G$ is plotted in nanometers on the ordinate. The binary grating structures are embedded in a laminate of plastic material (refractive index n≈1.5) as shown in FIG. 2a, wherein the reflection layer 11 (FIG. 2a) is formed by a layer of aluminum which is about 40 nm to 70 nm thick and which defines the mesa structure 2. For light with wavelengths in the range of $\lambda$=435 nm (blue) to 550 nm (green) the polarisation and/or contrast effects described hereinafter are more pronounced than for longer wavelengths.

The operation of checking the influence of the polarisation capability of the grating structure is effected in that, as shown in FIG. 6a, a polarisation filter 20 filters out of the light 22 incident on a surface pattern 21, the unwanted, TE-polarised or TM-polarised waves. The polarisation filter 20 is also to be arranged with the same effect between the grating structure and the eye of an observer, in which case the diffracted light 23, 23', 24, 24' is filtered.

EXAMPLE 1

The binary grating structure in FIG. 5a has the profile of the mesa structure 2, the function M(x) describing same being composed of the N=5 rectangular functions R(x) of Table 1. The significant direction of the grating structure, the grating vector, is indicated by the arrow 19.

TABLE 1

| Rectangular function | Pulse width t | Phase shift φ |
|---|---|---|
| R1(x) | 75 nm | 45° |
| R2(x) | 100 nm | 180° |
| R3(x) | 125 nm | 216° |
| R4(x) | 200 nm | 238½° |
| R5(x) | 200 nm | 324° |

The profile height $h_G$ is 90 nm and the smallest structure width is 75 nm, wherein the smallest structure width occurs both as a pulse width t=75 nm in the case of the rectangular function R1 and also as the width w=75 nm of the valley 4 (FIG. 1) between the rectangular functions R3 and R4. All pulse widths are markedly smaller than the wavelengths of visible light.

The mesa structure 2 shown in FIG. 5a, with perpendicularly incident light, diffracts a large part both of the TE-polarised waves (=TE-waves) and also the TM-polarised waves (=TM-waves) into the minus first diffraction order. The intensity of the light diffracted into the minus first diffraction order is markedly greater, at least by a factor of 5, than the light diffracted into one of the other diffraction orders perpendicularly to the valleys 4 in the direction of the grating vector.

Figure 6B:
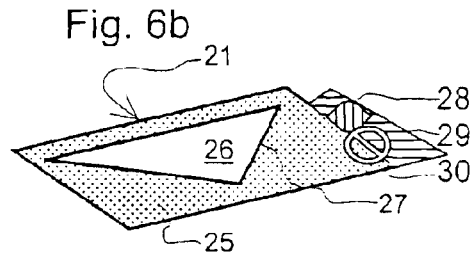

FIG. 6a shows the surface pattern 21 which by way of example comprises two surface elements 25, 26. The rectangular background element 25 is occupied by the binary grating structure shown in FIG. 5 in such a way that its significant direction is oriented parallel to the arrow 19. The triangular internal element 26 involves the same binary grating structure as the background element 25 but the significant direction of the binary grating structure is oriented in opposite relationship to the arrow 19. If the light 22 is incident perpendicularly on to the structures of the surface pattern 21, an observer who is looking for example in the direction opposite to the arrow 19 at the diffraction angle for the first diffraction order for the wavelength λ=435 nm (blue) to 550 nm (green) sees a blue to green background element 25 which shines brightly in the diffracted light 23 of the minus first diffraction order, with a blue to green internal element 26 which lights weakly in the diffracted light 24 of the plus first diffraction order. If the surface pattern 21 is turned through 180° in its plane, as is shown in FIG. 6b, the levels of intensity per unit of area, the levels of surface brightness, of the background element 25 and the internal element 26 are interchanged in the surface pattern 21, that is to say the background element 25 now deflects light 24' (FIG. 6a) of the plus first diffraction order to the eye of the observer and therefore appears dark and the internal element 26 which is now viewed in the diffracted light 23' (FIG. 6a) of the minus first diffractive order appears light. Polarisation of the light does not influence the observed intensity ratios as both the TE- and also the TM-waves are deflected primarily into the minus first diffraction order. In FIGS. 6a to 10c of the drawings raster dot patterns of varying densities clearly show the levels of surface brightness of the two elements 25, 26 of the illuminated surface pattern 21.

EXAMPLE 2

In FIG. 5b the profile of the asymmetrical mesa structure 2 (FIG. 5a) follows the descriptive function M(x) which arises as the sum of the N=5 rectangular functions (R(x)) shown in Table 2.

The profile height $h_G$ is 150 nm, the smallest structure width being 100 nm. The smallest structure width occurs both as a pulse width t=100 nm in the case of the rectangular functions R1(x), R3(x) and R4(x) and also as the width w=100 nm of the valley 4 (FIG. 1) between the rectangular functions R5(x) and R1(x+t) of the following period T (FIG. 5a) in the profile of the mesa structure 2.

TABLE 2

| Rectangular function | Pulse width t | Phase shift φ |
|---|---|---|
| R1(x) | 100 nm | 18° |
| R2(x) | 150 nm | 58½° |
| R3(x) | 100 nm | 117° |
| R4(x) | 100 nm | 180° |
| R5(x) | 550 nm | 261° |

In the case of perpendicularly incident light the mesa structure 2 shown in FIG. 5b diffracts a large part of the TE-waves into a single one of the minus or plus diffraction orders and practically no light into the other diffraction orders. The diffraction efficiency $E_{TE}$ in one of the other diffraction orders is markedly less (at least by a factor of 30) than for example the diffraction efficiency $E_{TE-1}$ of the light diffracted into the minus first diffraction order, that is to say $E_{TE-1}/E_{TE} \geq 30$ or $E_{TE+1}/E_{TE} \geq 30$. For the TM-waves, the diffraction efficiency $E_{TM}$ in all diffraction orders is lower by at least an order of magnitude than the diffraction efficiency $E_{TM0}$ in the zero order ($E_{TM0}/E_{TM} \geq 10$) as that binary grating structure acts as a mirror for the TM-waves and reflects the TM-waves into the zero diffraction order.

FIGS. 7a to 8c show the surface patterns 21 which by way of example consist of two surface elements 25, 26. The rectangular background element 25 is occupied by a symmetrical grating structure, for example with a sinusoidal profile, with the profile of a symmetrical rectangular function, and so forth. The triangular internal element 26 has the binary grating structure with the mesa structure 2 shown in FIG. 5b (FIG. 1), wherein in FIGS. 7a to 8c the significant direction, arrow 19, of the binary grating structure, is oriented from the tip to the base line of the internal element 26. The symmetrical grating structure of the background element 25 has the same period T and the same azimuthal orientation as the binary grating structure of the internal element 26 and has a diffraction efficiency of at least 40% into one of the plus and minus first diffraction orders.

Figure 7A:
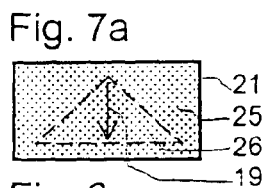

If unpolarised light 22 (FIG. 6a) is incident perpendicularly on to the structures of the surface pattern 21 shown in FIG. 7a, the observer who is viewing in the direction opposite to the arrow 19 at the diffraction angle for the first diffraction order for the wavelength λ=435 nm (blue) to 550 nm (green) sees in the diffracted light 23 (FIG. 6a) the surface pattern 21 as a uniformly brightly shining blue to green surface as the background element 25 and the internal element 26 have almost the same diffraction efficiency. The contrast at the common boundary of the two elements 25, 26 therefore disappears and it is not possible to recognise the internal element 26 on the background element 25. After a rotary movement through 180° in the plane of the surface pattern 21 shown in FIG. 7a the surface pattern 21 in FIG. 8a has changed in the unpolarised light, the internal element 26 standing out as a dark surface from the background element 25 as the binary grating structure of the internal element 26 only diffracts light into the plus first diffraction order with a low level of efficiency. The background element 25 occupied with the symmetrical diffraction grating in contrast is unchanged for the observer in terms of surface brightness before and after the rotary movement through 180°.

Figure 7B:
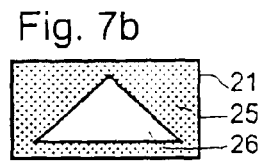
Figure 8A:
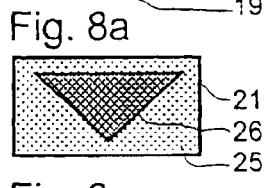
Figure 8B:
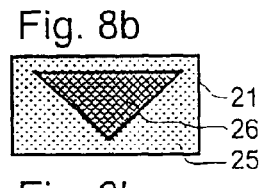

FIGS. 7b and 8b show the surface element 21 considered in linearly polarised light, wherein the TM-waves are filtered out by the polarisation filter 20 (FIG. 6a). In FIG. 7b the internal element 26 shines in the unweakened diffracted light 23 (FIG. 6a) of the minus first diffraction order while the component of the TM-waves is eliminated from the diffracted light which is diffracted by the background element 25 (FIG. 6a) and the surface brightness of the background element 25 is therefore attenuated. After the rotary movement of the surface element 21 in its plane through 180° the background element 25 exhibits the same surface brightness as prior to the rotary movement. The internal element 26 in contrast exhibits a markedly lower level of brightness than the background element 26 as the intensity in the plus first diffraction order is low, as is clearly shown in FIG. 8b.

Figure 7C:
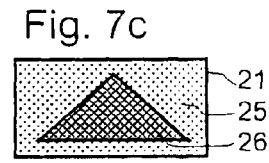
Figure 8C:
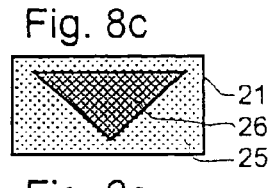

FIGS. 7c and 8c show the surface element 21 considered in linearly polarised light, wherein the TE-waves are filtered out by the polarisation filter 20 (FIG. 6a). Irrespective of the orientation 0° or 180° respectively the surface pattern 21 has the same appearance in the light of the TM-waves. In both orientations the background element 25 involves the same surface brightness. As the TE-waves are filtered out the surface brightness of the internal element 26 in both orientations is markedly weaker approximately by a factor of 4 to 6 than that of the background element 25 as the binary grating structure only diffracts the TE-waves with a low level of efficiency.

The ratio of the surface brightnesses in the surface element 21 of FIGS. 8a to 8c is maintained, irrespective of whether the diffracted light perceived by the observer is or is not polarised.

EXAMPLE 3

The binary grating structure in FIG. 5c involves the profile of the asymmetrical mesa structure 2 (FIG. 1) with a period of T=2 $\mu$m. The profile of the mesa structure 2 is determined by the function M(x) as the sum of the N=3 rectangular functions R(x) in Table 3.

TABLE 3

| Rectangular function | Pulse width t | Phase shift $\phi$ |
|---|---|---|
| R1(x) | 100 nm | 166½° |
| R2(x) | 150 nm | 202° |
| R3(x) | 670 nm | 239½° |

The profile height $h_G$ is 90 nm and the smallest structure width is 55 nm, wherein the smallest structure width occurs as the width w=55 nm of the valley 4 (FIG. 1) between the rectangular functions R2(x) and R3(x) of the same period T (FIG. 1).

The mesa structure 2 shown in FIG. 5c preferably diffracts the perpendicularly incident light 22 (FIG. 6a) into the two first diffraction orders. The proportion of the light diffracted into the other diffraction orders is substantially less. The diffraction efficiency of the mesa structure 2 for linearly polarised TE-waves is at least twice as great, in the negatively first diffraction order $E_{TE-1}$ as in the positively first diffraction order $E_{TE+1}$. In contrast the diffraction efficiency of the mesa structure 2 for linearly polarised TM-waves in the positively first diffraction order $E_{TM+1}$ is at least twice as great as in the negatively first diffraction order $E_{TM-1}$. The higher value of the diffraction efficiencies in the first diffraction order, both for the TE-waves and also for the TM-waves, are at least 20 times greater than the levels of intensity of the diffracted light in one of the other diffraction orders, wherein ideally $E_{TE-1}+E_{TM-1} \approx E_{TM+1}+E_{TE+1}$.

FIGS. 9a to 10c show the surface pattern 21 which by way of example consists of two surface elements 25, 26. As in Example 1 the rectangular background element 25 and the triangular internal element 26 have the same binary grating structure with the profile of the mesa structure 2 (FIG. 1) as shown in FIG. 5c. In FIGS. 9a to 10c the significant direction of that binary grating structure in the background element 25 is oriented parallel to the arrow 19 and in the internal element 26 it is oriented from the base line to the tip of the internal element 26, that is to say the significant directions of the binary grating structure in the background element 25 and the internal element 26 respectively are in mutually opposite relationship.

Figure 9A:
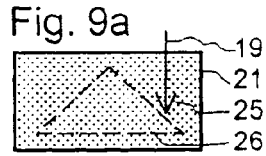
FIGS. 9a–c show the surface patterns with the mesa structure shown in FIG. 5c, FIGS. 10a–c show the surface patterns of FIGS. 9a–c turned through 180°.
Figure 10A:
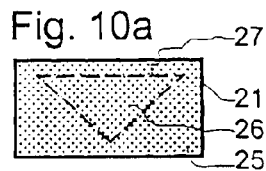

If unpolarised light 22 (FIG. 6a) is incident perpendicularly on to the structures of the surface pattern 21 shown in FIG. 9a then the observer in the diffracted light 23 (FIG. 6a), 24 (FIG. 6a) sees the surface pattern 21 as a uniformly brightly shining, blue to green surface, irrespective of whether he is looking at the diffraction angle for the first diffraction order for the wavelength $\lambda$=435 nm (blue) to 550 nm (green) in the direction opposite to the arrow 19 or, as shown in FIG. 10a, in the direction of the arrow 19. The diffraction efficiency of the grating structure in the background element 25 and in the internal element 26 are approximately the same for unpolarised light in the two first diffraction orders.

Therefore the contrast disappears at the common boundary 27 of the two elements 25, 26 in both azimuthal orientations 0° and 180° and the internal element 26 cannot be recognised in the surface of the background element 25.

Figure 9B:
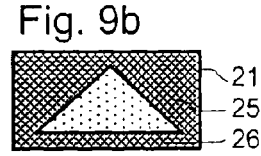
Figure 9C:
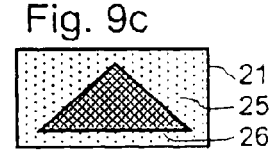
Figure 10B:
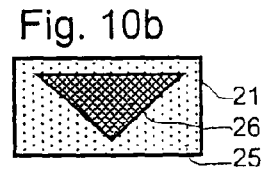

FIGS. 9b and 10b show the surface element 21 considered in linearly polarised light, wherein the TM-waves are filtered out by the polarisation filter 20 (FIG. 6a). In FIG. 7b the internal element 26 shines in the unweakened diffracted light 23 (FIG. 6a) of the minus first diffraction order. The surface brightness of the background element 25 in contrast is reduced by around two thirds as it is only the diffraction efficiency $E_{TE+1}$ of the plus first diffraction order that is still effective, as the proportion of the TM-waves is eliminated by the polarisation filter 20. The internal element 26 thus has a greater surface brightness than the background element 25. After the rotary movement of the surface element 21 in its plane through 180° the surface brightnesses of the background element 25 and the internal element 26 are interchanged, as can be seen from the view in the change from FIGS. 9b to 10b.

Figure 10C:
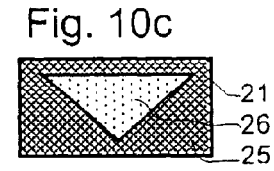

FIGS. 9c and 10c show the surface element 21 considered in linearly polarised light, wherein the TE-waves are filtered out by the polarisation filter 20 (FIG. 6a) which is rotated through 90° in its plane. Due to the rotary movement of the polarisation filter through 90° in each case the surface brightnesses of the background element 25 and the internal element 26 are interchanged so that the view in FIG. 9b changes to the view in FIG. 9c and the view in FIG. 10b changes to the view in FIG. 10c. In addition due to the rotary movement of the surface pattern 21 in its plane into the positions 0° and 180° the surface brightnesses of the background element 25 and the internal element 26 are interchanged so that the view in FIG. 9c changes to the view in FIG. 10c.

In an embodiment of the surface element 21 the internal elements 26 are in the form of alphanumeric characters, for example a text, or in the form of a bar code, which are visible in the polarised light on the background element 25 but which cannot be seen in usual unpolarised daylight.

The diffraction structures which are used in the combinations shown in FIGS. 7a to 10c can produce in the surface pattern 21 patterns which are dependent on the orientation relative to the observer and the polarisation effect and in which the contrast at common boundaries 27 (FIG. 6b) is striking or disappears respectively.

In an embodiment of FIG. 6b in the surface pattern 21 at least one surface element 25 with a binary grating structure is so arranged in the mosaic of the surface elements 26, 28, 29, 30 that, in a predetermined diffraction order, at least in one azimuth direction ψ the sum of the diffraction efficiencies $E_{TE}+E_{TM}$, for TE- and TM-waves of the surface element 25, is substantially equal to the sum of the diffraction efficiencies $E_{TE}+E_{TM}$, for TE- and TM-waves of the surface element 26 adjoining the surface element 25 so that, at the predetermined diffraction angle, the color and the surface brightnesses of the illuminated surface elements 25, 26 are identical and the contrast disappears at the common boundary 27 of the two surface elements 25, 26. That characteristic behaviour on the part of the surface pattern 21 is an authenticity feature for security elements, which is typically missing in holographic copies. The copies can therefore be recognised as such.

As is shown by means of the example of FIG. 6a, the surface pattern 21 only includes the two elements 25, 26 for the sake of simplicity. In a practical structure the surface pattern 21 as shown in FIG. 6b includes a large number of further surface elements 28 to 30 which, to produce the desired surface pattern 21, besides the above-mentioned diffraction structures, have any diffraction structures, reflective or scattering structures or absorbent surfaces.

Figure 11:
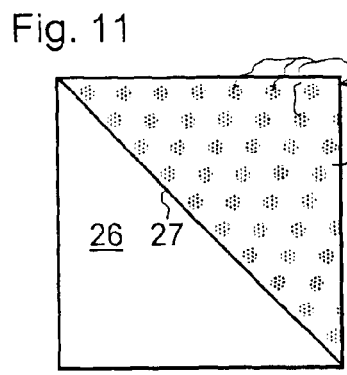
FIG. 11 shows another embodiment of the surface pattern.

FIG. 11 shows the surface pattern 21 with the two surface portions 25, 26. By way of example the binary grating of the surface element 25 exhibits the higher diffraction efficiency than the surface element 26. So that the contrast at the common boundary 27 between the surface portions 25, 26 of the surface pattern 21 in the above-described Examples 2 and 3 optimally disappears under predetermined viewing conditions, the surface brightnesses of the two surface portions 25, 26 must be exactly matched to each other. For that purpose, advantageously at least the surface component of the binary grating with the higher diffraction efficiency, here within the surface element 25, is reduced, in order in that way to attenuate the surface brightness of the surface element 25 and to provide for optimum adaptation to the other surface element 26 which involves weaker light. A reduction in the surface component of the grating structure in the surface element 25 is effected by a line or dot raster of very small raster surfaces 31, which is regular at least along the common boundary 27. The surfaces 31 are occupied for example with diffraction structures which deflect their diffracted light into a different direction from the gratings of the surface elements 25 and 26. Not all of the raster surfaces 31 within the surface element 25 or 26 respectively must have the same optical activity. Depending on the respective requirement of the surface pattern 21, instead of diffraction activity the raster surfaces 31 also have other optical activities as are produced by scattering structures or absorbent or reflective surfaces. The density and the proportion of the raster surfaces 31 corresponds to the required attenuation of the surface brightness of the surface element 25 as the totality of the raster surfaces 31 contributes nothing to the diffraction efficiency of the binary grating structure, such efficiency being averaged over the surface element 25. The averaged diffraction efficiency is therefore lower. At least one dimension of the raster surfaces 31 is advantageously less than 0.3 mm so that the human eye does not observe the raster under normal viewing conditions. It is to be noted once again that the raster in the views in FIGS. 6a to 10c serves only to distinguish the surface brightnesses, with means relating to the drawing.

In an embodiment the structures of the raster surfaces 31 are those of a Fourier hologram or kinoform containing information. The information can be rendered visible on a screen and read, only with monochromatic illumination of the surface element 25 having those raster surfaces 31.

The diffraction structures of the type of the above-described mesa structures 2 (FIG. 1) have the advantage that they cannot be copied with the known holographic means.

Figure 12:
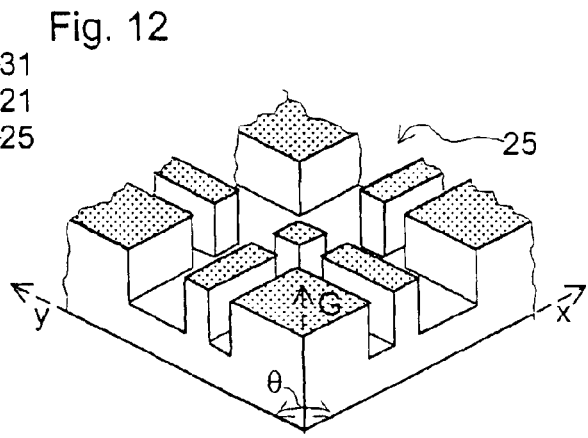
FIG. 12 shows a two-dimensional mesa structure.

FIG. 12 shows a grating structure over the plane x/y, which is defined by a binary grating function G comprising two mutually superimposed rectangular functions M(x) and M(y), the valleys 4 of which (FIG. 2) cross at an intersection angle θ. The periods T of the two rectangular functions M(x) and M(y) are not necessarily identical. The two rectangular functions M(x) and M(y) expand independently of each other along the abscissa x and y respectively. In an embodiment for example in the direction of the abscissa x the rectangular structure M(x) or M(y) respectively extends into the surface element 26 (FIG. 6a) which adjoins the surface element 25 with the grating structure G and which accordingly is occupied with the rectangular structure M(x) and M(y) respectively. The lacquer layer 10 (FIG. 2a) filling the valleys 4 and further layers have been omitted for reasons relating to drawing. The observer sees, on the illuminated surface pattern 21 (FIG. 6a), at the predetermined diffraction angle, the patterns with the contrast differences at the azimuth angles ψ with the values 0°, θ°, 180°, and 180°+θ°, wherein the significant direction specified by the arrow 19 (FIG. 1) identifies the azimuth angle 0° and θ identifies the intersection angle of the two functions M(x) and M(y) or coordinates x, y. For technical reasons the range of values for the intersection angle θ is limited to the range of 30° to 150°.

What is claimed is:

1. A light-diffractive binary grating structure with a microscopic mesa structure comprising periodically repeated plateaus separated by substantially rectangular valleys, wherein the arrangement of the valleys within a period of the mesa structure is an additive superimposition of at least three phase-shifted rectangular structures of a period equal to the period of the mesa structure, wherein the rectangular structures have a phase shift relative to each other in such a way that the plateaus of one rectangular structure fall into the valleys of the other rectangular structures and the mesa structure has an optically effective profile height of a value from the range of 25 nm to 5,000 nm, wherein
    an interface of the mesa structure is of a metallically reflective nature of visible incident light of a wavelength, and the period of the mesa structure is of a value in the range of 250 nm to 5,000 nm and at least one valley between two plateaus is of a width greater than a seventh of the period.

2. A grating structure as set forth in claim 1, wherein the interface of the mesa structure is in the form of a reflection layer and is arranged between a lacquer layer and a protective layer.

3. A grating structure as set forth in claim 1, wherein the mesa structure is molded in a metal surface with or without a protective layer filling the valleys.

4. A grating structure as set forth in claim 1, wherein the smallest structure width of the mesa structure is less than a fifth of the wavelength of the incident light.

5. A grating structure as set forth in claim 1, wherein the period of the mesa structure changes in a direction parallel to the valleys in such a way that the valleys diverge or meander.

6. A grating structure as set forth in claim 1, wherein the distribution of the plateaus within a period of the mesa structure is asymmetrical, wherein in the one half-period the sum of the pulse widths of all plateaus is smaller than the sum of the pulse widths of all plateaus in the other half-period, and wherein the pulse widths and the number of rectangular structures and their phase shifts are predetermined in such a way that the mesa structure has asymmetrical diffraction efficiencies for the incident light for the various diffraction orders.

7. A grating structure as set forth in claim 6, wherein the asymmetrical distribution of the plateaus within a period of the mesa structure is such that both TE-polarized waves of the light and also TM-polarized waves of the light are deflected asymmetrically into a single, predetermined negative or positive diffraction order.

8. A grating structure as set forth in claim 6, wherein the asymmetrical distribution of the plateaus within a period of the mesa structure is such that essentially only for transverse electric (TE)-polarized waves of the light, the diffraction efficiency ($E_{TE}$) in the single predetermined negative or positive diffraction order is greater than in the other diffraction orders, in that for transverse magnetic (TM)-polarized waves of the light the mesa structure acts as a mirror.

9. A grating structure as set forth in claim 6, wherein the asymmetrical distribution of the plateaus within a period of the mesa structure is such that for TE-polarized waves of the light the diffraction efficiency ($E_{-TE}$) which can be established in the negative diffraction order of a predetermined order is at least twice as great as the diffraction efficiency ($E_{+TE}$) in the positive diffraction order of the same order and that for TM-polarized waves of the light the diffraction efficiency ($E_{+TM}$) which can be measured in the same predetermined order, in the positive diffraction order, is at least twice as great as the diffraction efficiency ($E_{-TM}$) in the negative diffraction order.

10. A security element with a surface pattern which is embedded in a laminate of transparent plastic material and which has a mosaic-like arrangement of surface elements which are occupied by microscopically fine grating structures and which diffract, scatter or reflect incident light of a wavelength, wherein the optical effectiveness of the grating structures is increased with a metallic reflection layer, wherein arranged at least in a first of the surface elements is a binary grating structure which is a mesa structure comprising periodically repeated plateaus of a pulse width, which are separated by substantially rectangular valleys, the arrangement of the valleys within a period of the mesa structure is an additive superimposition of at least three phase-shifted rectangular structures of a period equal to the period of the mesa structure, wherein the rectangular structures have a phase shift relative to each other in such a way that the plateaus of the one rectangular structure fall into the valleys of the other rectangular structures and at least one valley between two plateaus is of a width greater than a seventh of the period, the plateaus in the valleys towards the incident light have an optically effective profile height of a value from the range of 25 nm to 5,000 nm and the period of the mesa structure is of a value in the range of 250 nm to 5,000 nm.

11. A security element as set forth in claim 10, wherein the mesa structure has five plateaus asymmetrically distributed within the period and with pulse widths of smaller than a fifth of the wavelengths and that the diffraction efficiency of the mesa structure both for TE-polarized waves of the light and also for TM-polarized waves of the light into the minus first diffraction order is greater at least by a factor of 5 than the diffraction efficiency in one of the other diffraction orders.

12. A security element as set forth in claim 11, wherein the mesa structure has five plateaus distributed asymmetrically within the period, within the period in the case of four of the plateaus the pulse widths are smaller than a fifth of the wavelengths of the visible incident light and the pulse width of the fifth plateau is greater than the sum of the other four pulse widths, and for the perpendicularly incident light the diffraction efficiency of the mesa structure for TE-polarized waves of the light into the minus first diffraction order is at least thirty times greater than the diffraction efficiency for the TE-polarized waves in one of the other diffraction orders and that for TM-polarized waves of the light the mesa structure acts as a mirror.

13. A security element as set froth in claim 11, wherein the mesa structure has three plateaus distributed asymmetrically within the period, within the period in the case of two of the plateaus the pulse widths are smaller than a fifth of the wavelengths of the incident light and the pulse width of the third plateau is greater than the sum of the other two pulse widths, with perpendicularly incident light the diffraction efficiency of the mesa structure for the minus first diffraction order with TE-polarized waves of the incident light is at least twice greater than for TM-polarized waves of the incident light, the diffraction efficiency for the plus first diffraction order with the TM-polarized waves is at least twice greater than for the TE-polarized waves, and a sum of the diffraction efficiencies of the TE- and the TM-polarized waves in the plus first diffraction order is substantially equal to a sum of the diffraction efficiencies of the TE- and the TM-polarized waves in the minus first diffraction order.

14. A security element as set forth in claim 11, wherein a second surface element adjoining the surface element with the mesa structure is occupied with a symmetrical diffraction grating and that the mesa structure and the symmetrical diffraction grating have the same period and the same azimuthal orientation of the grating structure.

15. A security element as set forth in claim 11, wherein a second surface element adjoining the surface element with the mesa structure is occupied with the same mesa structure and that the two mesa structures differ in the significant direction of the binary grating structure.

16. A security element as set forth in claim 15, wherein surface brightnesses of the mutually adjoining surface elements are so adjusted that the surface brightness of the first surface element is adapted to the weaker-light second surface element, wherein in the first surface element the proportion of the grating structure is reduced by a raster-like arrangement of light deflecting raster elements which are of dimensions of smaller than 0.3 mm.

* * * * *

UNITED STATES PATENT AND TRADEMARK OFFICE
CERTIFICATE OF CORRECTION

PATENT NO. : 6,906,861 B2
DATED : June 14, 2005
INVENTOR(S) : Staub et al.

Page 1 of 1

It is certified that error appears in the above-identified patent and that said Letters Patent is hereby corrected as shown below:

Title page,
Item [74], *Attorney, Agent, or Firm*, now reads: "Hoffman & Baron, LLP" should read: -- Hoffmann & Baron, LLP --.

Column 4,
Line 26, now reads: "refractive indices $n_1$, $n_2$ and also cause a jump An in the" should read: -- refractive indices $n_1$, $n_2$ and also cause a jump $\Delta n$ in the --.

Column 5,
Line 22, now reads: "fifth of the wavelength X of the incident visible light." should read -- fifth of the wavelength $\lambda$ of the incident visible light. --.

Signed and Sealed this

Thirteenth Day of December, 2005

JON W. DUDAS
*Director of the United States Patent and Trademark Office*